HENRY N. FAIRBANKS
THOMAS M. MADIGAN, JR.
INVENTORS

BY *Stanley Belsky*

ATTORNEY

April 2, 1968  H. N. FAIRBANKS ET AL  3,375,752
COPYBOARD LIGHTING SYSTEM

Filed Feb. 19, 1965  3 Sheets-Sheet 2

HENRY N. FAIRBANKS
THOMAS M. MADIGAN, JR.
INVENTORS

BY Stanley Belsky

ATTORNEY

April 2, 1968   H. N. FAIRBANKS ET AL   3,375,752
COPYBOARD LIGHTING SYSTEM

Filed Feb. 19, 1965   3 Sheets-Sheet 3

HENRY N. FAIRBANKS
THOMAS M. MADIGAN, JR.
INVENTORS

BY *Stanley Belsky*

ATTORNEY

United States Patent Office 3,375,752
Patented Apr. 2, 1968

3,375,752
COPYBOARD LIGHTING SYSTEM
Henry N. Fairbanks and Thomas M. Madigan, Jr., Rochester, N.Y., assignors to Itek Corporation, Lexington, Mass., a corporation of Delaware
Filed Feb. 19, 1965, Ser. No. 433,949
13 Claims. (Cl. 88—24)

ABSTRACT OF THE DISCLOSURE

This disclosure is drawn to a unique light source having a reflector of a particular shape and which produces a predetermined light intensity distribution, which may readily be utilized in conjunction with a copyboard bearing copy to be reproduced with uniform results.

---

The present invention relates to a copyboard lighting system and more particularly to an improved system of arranging illuminating lamps relative to a copyboard and to an improved reflector for a copyboard illuminating lamp.

Copyboards for photoreproduction of copies are well known and generally comprise a surface on which the copy to be reproduced is positioned. Such copyboards are arranged relative to copying cameras, and are widely used in the making of offset masters, in microfilming operations, and for other photoreproductive processes. Copyboards must be properly illuminated for quality reproduction of copies, offset masters, etc.

Previous copyboard illuminating systems have not provided optimum illumination, were not satisfactorily adjustable, and have tended to be large, heavy, expensive, and inefficient. For relatively wide camera angles and large copies, previous copyboard illuminating systems have not compensated for the well-known $\cos^4$ law of light transmission through the camera lens. The $\cos^4$ law holds that the intensity of the image of an object off the axis of the lens is decreased by a function of the $\cos^4$ of the angle of the object from the lens axis. For most applications this law requires that the edges of the copy be more brightly illuminated than the center to obtain an image of even intensity. The larger the lens angle of the copying camera and the larger the corresponding copy, the more important is the $\cos^4$ law.

An object of this invention is to overcome the deficiencies of prior art copyboard illuminating systems and to illuminate various sized copies with optimum illumination by means of small, inexpensive, efficient, and easily adjustable illuminating lamps.

Another object of the invention is to illuminate the edges of various sizes of copies on a copyboard more brightly than their centers to compensate for the effect of the $\cos^4$ law relative to the lens of the copying camera.

Another object of the invention is to illuminate a copyboard in an adjustable intensity pattern and to predetermined light levels without portions of the copyboard being over or under-illuminated.

Another object of the invention is to improve the efficiency of copyboard illuminating lamps while keeping their size, weight and expense to a minimum.

Another object of the invention is to provide a copyboard illuminating lamp the light beam from which is diverging and has substantially the characteristics of a point source throughout a predetermined solid angle.

These and other objects of the invention are accomplished generally by an improved adjustable arrangement of illuminating lamps relative to a copyboard and by an improved lamp reflector formed generally as a "divergent parabolic cylinder" as hereinafter described that is preferably adjustable for directing an even, but divergent beam of light across a copyboard. Light from a source having an improved reflector according to the invention is preferred for compensating for the $\cos^4$ law in copy illumination according to the invention because such a source can produce a beam of light that for a solid angle subtending a copy has uniform intensity at all angles as characteristics of a point source. Such a beam of light having point source characteristics can be positioned and aimed so that its illumination of predetermined portions of the copy can be easily determined by the well-known inverse square law. Accordingly, a plurality of such beams can be arranged simply and conveniently within the spirit of the invention to illuminate the copy more brightly in its peripheral area so as to compensate for the $\cos^4$ law. Thus, a combination of an improved reflector for a light source according to the invention and arrangement of a plurality of such sources relative to a copy on a copyboard within the spirit of the invention operates to provide optimum lighting of a copy as a distinct improvement over previously known copyboard lighting systems.

The certain improvements and combinations in which the invention resides all will be hereinafter more fully described, the novel features being pointed out in the claims at the end of this specification.

Improved lamp reflector

Before discussing the positioning of illuminating lamps according to the improved copyboard lighting system for optimum illumination of a copy, the improved lamp reflector according to the invention will be described.

Figure 3:
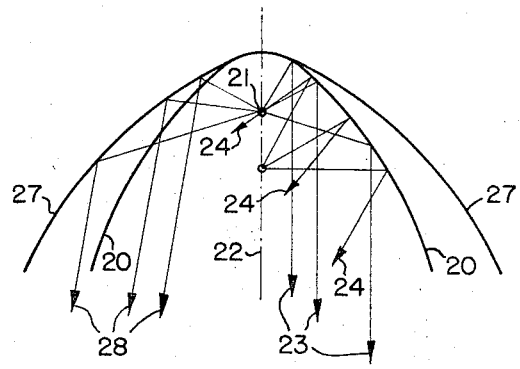
FIG. 3 shows a partially schematic representation of the light reflecting characteristics of a standard parabolic reflector as compared to a "divergent" parabolic reflector according to the invention.
Figure 7:
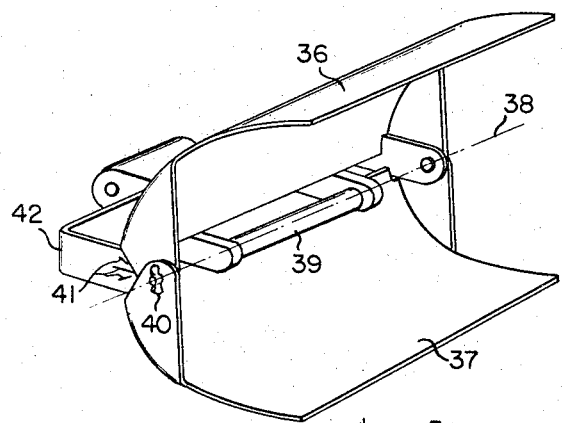
FIG. 7 shows an isometric view of a reflector formed of parabolic hemicylinders that are adjustable for "divergence" according to the invention.

In FIG. 3, parabolic curve 20 schematically represents a standard parabolic lamp reflector. In addition to paraboloid reflectors formed by a revolution of curve 20, lamp reflectors are commonly formed as parabolic cylinders. FIG. 7 best shows an approximation of a parabolic cylindrical lamp reflector, and the inventive reflector is an improvement in standard parabolic cylindrical lamp reflectors to adapt light sources to copyboard illumination.

The form of the reflector in a standard parabolic cylindrical reflector is parabolic in normal cross section and linear in longitudinal cross section. A linear focal axis extends through the foci of all the parabolic cross sections, and an elongate, generally linear lamp is disposed in the focal axis. The parabola axis 22 of FIG. 3 is extended in a parabolic cylinder to form a plane in which the axes of all the parabolic sections lie, so that the plane passes through the focal axis and divides a parabolic cylindrical reflector into two hemicylindrical portions. For convenience of reference throughout the specification and claims, when referring to a plane parabola we will use the terms "focus" and "axis," and when referring to a parabolic cylinder or parabolic hemicylinder we will use the terms "focal axis" and "axial plane." Thus, taking curve 20 in FIG. 3 as schematically representative of a parabolic cylindrical reflector, the numeral 21 designates the focal axis, and the numeral 22 designates the axial plane.

Figure 4:
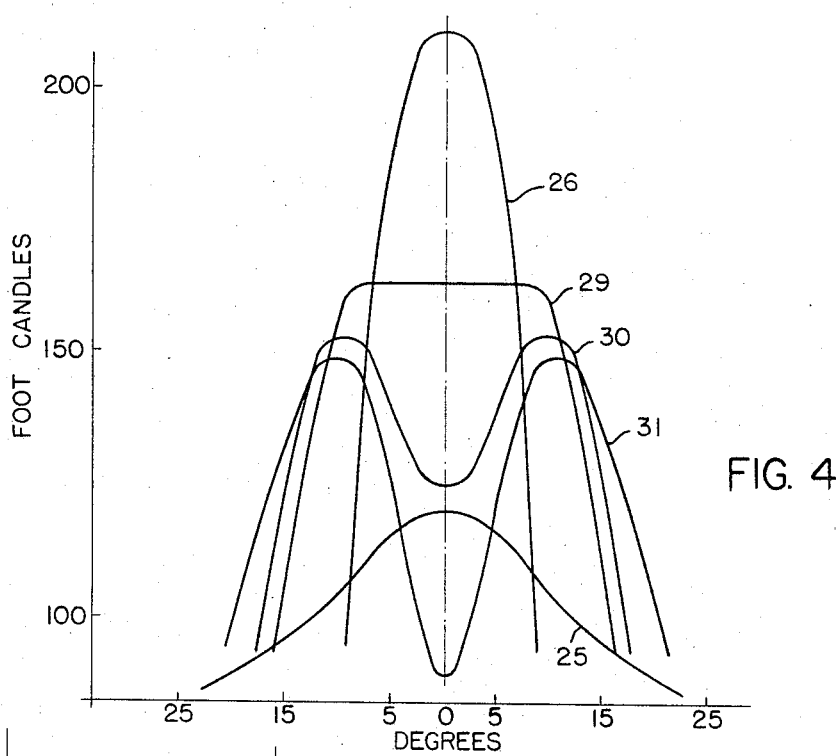
FIG. 4 shows the spacial intensity of beams of light from standard parabolic reflectors compared with "divergent" parabolic reflectors according to the invention.

Parallel radiation lines 23 schematically represent the narrow, even beam of illumination obtainable from a parabolic cylindrical reflector having a light source disposed in the focal axis 21. Curve 26 in FIG. 4 shows the spacial intensity of a beam of light from a parabolic cylindrical reflector. The illumination intensity of such a beam tapers off sharply at angles off the axial plane of the parabolic cylindrical reflector, and the intensity of such a beam is greatest at a peak in the axial plane. If such a beam is directed onto a copy on a copyboard, it tends to illuminate the center of the copy more brightly than its peripheral areas in contravention of the $\cos^4$ law for the camera lens.

Divergent illumination beams have formerly been produced by moving the incandescent lamp off the focal axis of a parabolic cylindrical reflector, and usually forward of the focal axis. Radiation lines 24 of FIG. 3 show that light from a source positioned in the axial plane 22 but forward of the focal axis 21 of a parabolic cylindrical reflector is reflected across the axial plane so as to diverge outward from the reflector. Radiation such as represented by arrows 24 is typical of "wide flood" lamps, and curve 25 in FIG. 4 represents the spacial intensity of a typical illumination beam from a "wide flood" lamp having a parabolic cylindrical reflector and having its source forward of the focal axis. It can be seen from curve 25 that the intensity of such illumination has a substantial peak on the axial plane and is gradually reduced off the axial plane so that its spacial intensity approximates a normal distribution curve.

The most desirable divergent illumination for copyboard lighting according to the invention is formed of beams each of which has the characteristics of a point source in that at a given distance from the source, the illumination intensity at any angle is the same. According to the invention, such point source characteristics of an illumination beam are preferred at least throughout a solid angle subtending the copy to be illuminated. The improved reflector according to the invention produces such a beam of illumination from a lamp arranged on the focal axis of the reflector and is preferred in the inventive copyboard lighting system.

The inventive reflector has been referred to above as having the form of a "divergent" parabolic cylinder, and this term is appropriate because, in effect, the inventive reflector is formed by dividing a parabolic cylinder in half at the axial plane and pivoting the parabolic hemicylinders relative to each other about their common focal axis so that while each half of the reflector remains a substantial portion of a parabolic hemicylinder, the two portions diverge outward relative to a true parabolic cylinder. This outward divergence can be seen in FIG. 3 as represented by the curve 27.

Both parabolic hemicylindrical portions of curve 27 have the same focal axis 21, and light from a source disposed in focal axis 21 is reflected as parallel radiation from each hemicylindrical portion. Because of the divergence of the hemicylinders, parallel radiation from each hemicylinder is divergent relative to parallel radiation from the other. Effectively, such divergence splits the parallel beam from a parabolic cylinder at its axial plane and diverges the two halves of the beam. Divergent radiation directly from the incandescent or other lamp arranged on the focal axis fills the gap between the two beams and overlaps these beams so that the overall resulting beam, depending on the divergence of the parabolic hemicylinders, can be made of even intensity throughout a predetermined solid angle. This can be seen from curve 29 of FIG. 4 the flat-topped portion of which represents the even, point source characteristic portion of the resulting beam and shows the solid angle of its extent from the axial plane of the source.

The beam represented by curve 29 is produced by a relatively small divergence of the parabolic hemicylinders of a reflector according to the invention. Curves 30 and 31 illustrate that increasing the divergence between the parabolic hemicylinders produces beams deviating from point source characteristics in that they are intense along the respective axial planes of each hemicylindrical portion of the reflector and less intense in the central portion lying on a plane midway between the respective axial planes of the hemicylindrical portions.

For most copyboard illumination applications, a beam such as represented by curve 29 is desirable over prior art beams such as represented by curves 25 and 26. A beam such as represented by curve 29 can be directed onto a copy on a copyboard so that the copy is subtended by the solid angle throughout which the beam has point source characteristics. Evenly divergent light in such a beam directed onto a copy illuminates the copy according to the inverse square law of the distance of any portion of the copy from the source, so that a plurality of such sources can be arranged for illuminating the copy more intensely at its peripheral area than in its center to compensate for the $\cos^4$ law effect on the copying camera lens.

Figure 8:
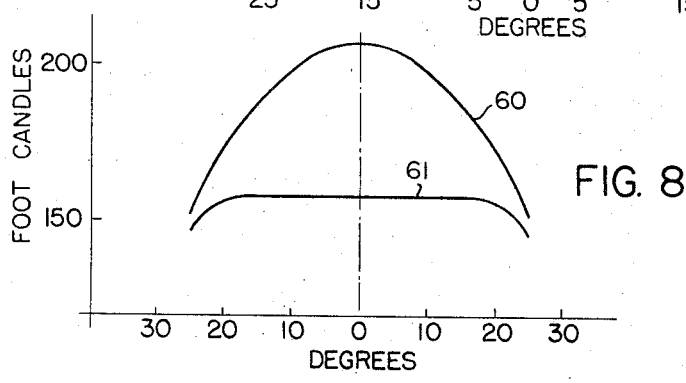
FIG. 8 shows the spacial intensity of a beam of light from a "divergent" parabolic reflector longitudinally of the reflector.

Another advantage of illumination beams produced by the inventive reflector and represented by curve 29 is that longitudinally of the reflector the beam also has point source characteristics rather than an intensity peak in the plane of the longitudinal center line of the reflector. This can be seen from the curves of FIG. 8 wherein curve 60 represents the prior art peak produced longitudinally of a reflector by a standard parabolic cylindrical reflector and curve 61 represents the even intensity throughout a solid angle of a beam produced by the inventive divergent parabolic reflector, such even intensity beam having point source characteristics as described above.

Of course, divergent parabolic hemicylindrical portions of reflectors according to the invention need not be separate. In describing the inventive reflector, it is convenient to think of a parabolic cylindrical reflector divided in half at its axial plane, and the hemicylindrical portions rotated about the focal axis for divergence, but reflectors according to the invention can obviously be formed as a single piece to conform to the curve resulting from such divergence of a pair of opposed parabolic hemicylindrical portions.

Figure 6:
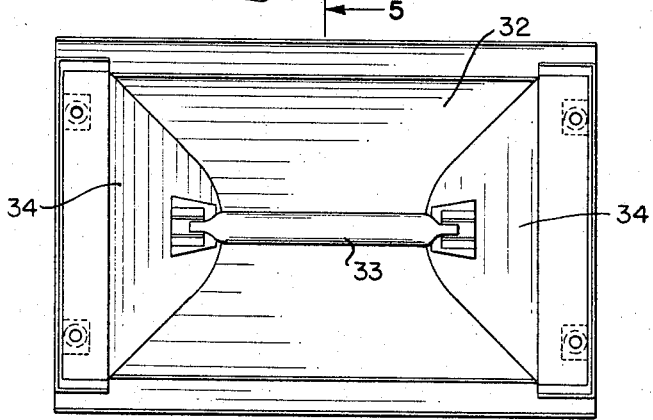
FIG. 6 shows a cross section of the reflector of FIG. 5.
Figure 5:
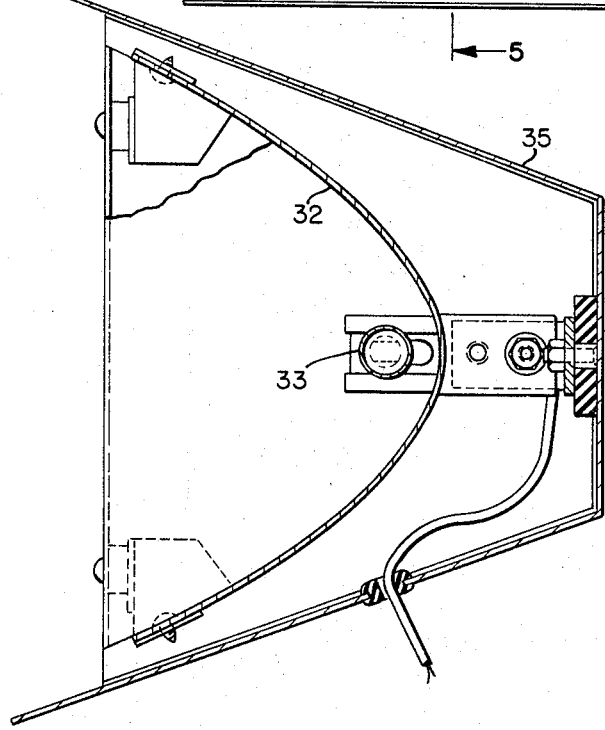
FIG. 5 shows a front elevation of a "divergent" parabolic reflector according to the invention.

FIGS. 5 and 6 show a reflector embodiment according to the invention having a divergent parabolic cylindrical reflector 32 formed as a single piece, and an incandescent lamp 33 arranged on the common focal axis of the two hemicylindrical portions of the reflector 32. Preferably, plane end reflector panels 34 are arranged at opposite ends of lamp 33 for extending the longitudinal range of the resultant beam beyond the ends of lamp 33. The reflector assembly is conveniently arranged in a housing 35 adapted for mounting on and electrical connection with a copyboard lighting system according to the invention.

FIG. 7 shows an adjustably divergent parabolic cylindrical reflector according to the invention. Upper parabolic hemicylindrical reflector member 36 and lower parabolic hemicylindrical reflector member 37 are pivotally adjustable relative to each other for variable divergence. The pivot axis 38 of the two hemicylindrical members forms a common focal axis in which lamp 39 is disposed so that regardless of the divergence of the hemicylinders, they continuously share the common focal axis.

Means such as wing nuts 40 are preferably arranged for holding hemicylindrical members 36 and 37 at the desired divergence setting, and marks 41 are preferably arranged on frame support 42 for indicating various degrees of the divergence to which the hemicylinders may be set. Of course, a variety of means can be used for holding the hemicylinders at the desired setting, and other indicator marks are possible within the spirit of the invention for showing the divergence setting. For example, the hemicylindrical portions of the reflector can also be coupled by mechanical means arranged so that the divergence setting is controlled by a knob or lever.

Adjustableness of the divergent parabolic reflector according to the invention is desirable for varying the characteristics of the resultant illumination beam for different copying applications such as for adjusting the illumination of an unevenly formed copy of varying density. Depending upon the illumination needed, the beam from a source having a reflector adjustable for divergence according to the invention can be made wider or narrower, can be adjusted for point source characteristics or for one or two peaks in intensity. Persons skilled in the art will readily understand the adjustment of the reflector of FIG. 7 for different copying applications in view of output curves 29–31 of FIG. 4.

*Lamp position adjustment*

Lamps having reflectors according to the invention are preferably arranged for optimum illumination of a copy on a copyboard, and the invention encompasses a comprehensive copyboard lighting system for positioning of light sources for optimum illumination of various sizes of copies.

The above mentioned $\cos^4$ law is preferably compensated for by illuminating the peripheral areas of a copy more intensely than its center, and according to the invention, lights are adjustably arranged relative to a copyboard for illuminating a variety of sizes of copies to compensate for the $\cos^4$ law. Also, adjustability of the lighting system according to the invention is preferably provided to allow special lighting for various copy problems such as copies of uneven intensity that need extra illumination in some areas.

In one application of the invention to a copyboard for making offset masters, the smallest copies intended for the board are placed within broken line 45 on the front central portion of copyboard 43. The copying camera is preferably adjusted for forming an image the size of the rectangle enclosed within broken line 45 and is adjustable for forming the same size image of larger copies placed on the board. The lens adjustment for the copying camera is preferably arranged relative to board 43 so that in the one-to-one reproduction of a relatively small copy arranged within broken line 45, the copying camera lens is centered over the rectangle enclosed within broken line 45. Also, the lens position for forming a standard image size of larger sized copies is preferably arranged so that one edge of any copy to be reproduced lies along the edge 46 of copyboard 43 when such copy is centered under its lens. Thus, lamps 44 are appropriately positioned longitudinally of board 43 for illuminating a variety of sizes of copies, and need not be movable longitudinally of the board 43.

Figure 1:
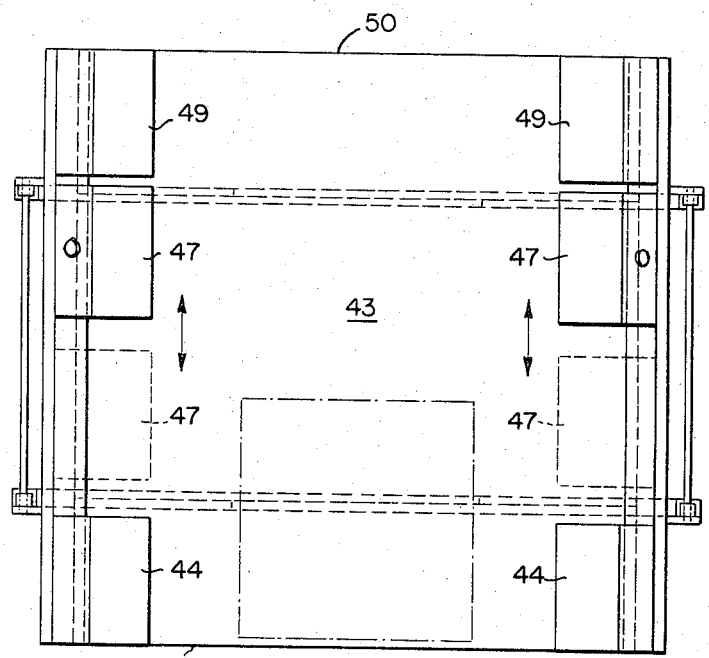
FIG. 1 shows a plan view of a copyboard and adjustable illuminating lamps arranged according to the invention.

Lamps 47 are preferably movable longitudinally of board 43 on lamp support frame 48 as shown by the arrows in FIG. 1. For relatively small copies, lamps 47 are moved near lamps 44, and are moved away from lamps 44 for relatively larger copies. For the largest copies usable on board 43, preferably a third pair of lamps 49 are arranged at the end of lamp support frames 48 opposite the end on which lamps 44 are mounted. Lamps 49 are preferably selectably illuminated so that they are not used except for the larger copies extending near the edge 50 of copyboard 43.

Lamps 44, 47, and 49 can be of the fixed reflector type illustrated in FIGS. 5 and 6 or can have variably divergent reflectors such as illustrated in FIG. 7. Either type of reflector preferably has a dimpled surface to avoid reflecting an image of the lamp filament. It is preferred that lamps according to the invention be aimed at approximately the longitudinal center line of a copy arranged on board 43 and that such lamps be movable toward and away from a copy on board 43 for varying the intensity of the illumination for different sized copies and for subtending different sized copies within their illumination beams.

The longitudinal edges of a copy arranged on board 43 are closest to the light sources arranged along the longitudinal edges of board 43, and thus according to the inverse square law are more brightly illuminated than areas of the copy that are at a greater distance from a source. Thus, by the illustrated arrangement, sources having divergent beams with point source characteristics according to the invention illuminate the edges of a copy more intensely than its center to compensate for the $\cos^4$ law of the copying camera lens.

For smaller copies, the effect of the $\cos^4$ law is relatively less pronounced because the lens angle for such copies is less. Also, the effective lens aperture for smaller copies is reduced so that increased illumination of small copies is advantageous. Accordingly, light sources according to the invention are moved downward and inward toward smaller copies for increasing the illumination intensity. Conversely, for larger copies requiring a wider lens angle that is more greatly affected by the $\cos^4$ law, sources according to the invention are moved outward and upward so that the copy is subtended by the solid angle portions of illumination beams that have the characteristics of a point source to compensate for the $\cos^4$ law. The reduced intensity of illumination from the sources being at a greater distance is in part compensated for by the larger effective lens aperture.

Figure 2:
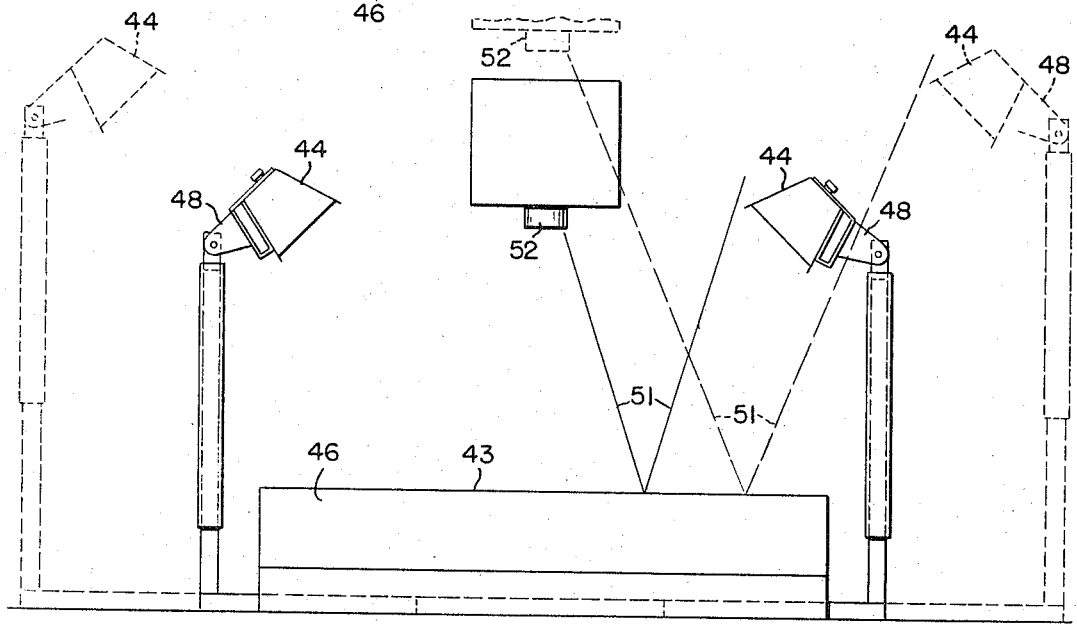
FIG. 2 shows a front elevation of the copyboard of FIG. 1 with illuminating lamps arranged according to the invention.

FIG. 2 shows the vertical and lateral movement of an array of light sources represented by sources 44 on support frames 48. The solid line position of sources 44 represents their closest and lowermost position for the smallest copy intended to be arranged on board 43, and the broken line position of sources 44 represents their outermost and most elevated position for the largest copies intended for board 43. Sources 44 can be positioned intermediate their solid and broken line positions for optimum illumination of a variety of copy sizes. Generally, sources 44 are adjusted along a line of positions that is inclined at approximately 45 degrees to the surface of copyboard 43. In one preferred embodiment the lateral separation of sources 44 on opposite sides of a copy arranged on board 43 is approximately equal to the diagonal of such copy, and the elevation of sources 44 above board 43 is approximately equal to one half such diagonal.

Vertical and lateral movement of light sources according to the invention is limited by the line of reflection 51 from camera lens 52. To avoid any reflection from light sources 44 directly into the lens 52 of the copying camera, light sources 44 are placed outside of reflection line 51.

A variety of brackets, mechanical connections, and motion devices may be used for movement of lamp support frames 48 and lamps according to the invention relative to copyboard 43, and any such devices are within the spirit of the invention.

While the invention has been disclosed herein by reference to the details of a preferred embodiment, it is to be understood that such disclosure is intended in an illustrative rather than a limiting sense, and it is contemplated that various modifications of the construction and arrangement of the parts will readily occur to those skilled in the art within the spirit of the invention and the scope of the appended claims.

We claim:

1. A copyboard lighting system for illuminating copy thereon comprising:

(a) a first and second pair of light sources, each light source including an elongated lamp, a first reflector portion formed substantially as a parabolic hemicylinder and arranged on one side of said lamp so that said lamp lies generally in the focal axis of said first reflector portion, and a second reflector portion formed substantially as a parabolic hemicylinder and arranged on the other side of said lamp so that said lamp lies generally in the focal axis of said second reflector portion, said second reflector portion being divergent outward relative to the parabolic cylindrical extension of said first portion;

(b) means for positioning said first pair of light sources at positions displaced from said copyboard and laterally outward of the copy positioned upon said copyboard;

(c) means for positioning said second pair of light sources at positions displaced from said copyboard and laterally outward of said copy positioned on said copyboard.

2. The combination as set forth in claim 1 further including means for moving said second pair of light sources longitudinally of said copyboard.

3. The combination as set forth in claim 2 further including a third pair of light sources similar to said first and second pairs of light sources separated from said copyboard and positioned laterally outward of said copy on said copyboard.

4. The combination as set forth in claim 1 including means for adjusting the distance of said light sources away from and outward relative to said copyboard.

5. The combination as set forth in claim 1 further including means for aiming said light sources approximately at the longitudinal center line of said copy arranged on said copyboard.

6. A copyboard lighting system comprising:
(a) a plurality of lamps each of which has a reflector including a pair of parabolic substantially hemicylindrical portions arranged in opposition about a common focal axis and divergent relative to a parabolic cylinder having said focal axis, and;
(b) means for positioning at least two pairs of said lamps at positions displaced from said copyboard and outwardly of a copy arranged on said copyboard.

7. The combination as set forth in claim 6 wherein at least one of said pairs of lamps is adjustable longitudinally of said copyboard.

8. The combination as set forth in claim 7 including means for adjusting the distance of said lamps away from and laterally of said copyboard.

9. A copyboard lighting system having a plurality of lamps each of which has a reflector arranged for forming a slightly diverging beam of light having a central band formed of diverging light from said lamp and a pair of outer bands of generally parallel light, said outer bands diverging from each other, and said slightly diverging beam having approximately the characteristics of a point source throughout a predetermined solid angle, and;
(a) positioning means for positioning said lamps at positions displaced from said copyboard to direct their respective diverging beams upon a copy arranged on said copyboard.

10. In combination as set forth in claim 9 wherein said light sources are arranged in opposite pairs displaced from said copyboard and including means for adjusting the distance of said lamps away from said copyboard and laterally of said copyboard.

11. In combination as set forth in claim 9 wherein said positioning means positions said lamps in approximate alignment with the corners of said copy.

12. In combination as set forth in claim 6 wherein said reflector has a cross sectional shape corresponding to curve twenty-seven of FIGURE 3.

13. A light source comprising:
(a) a cylindrical reflector having a focal axis, the cross sectional shape of the reflective surface of said cylindrical reflector taken through planes perpendicular to said focal axis corresponding to curve twenty-seven of FIGURE 3;
(b) an elongated lamp and;
(c) means for positioning said lamp along said focal axis.

References Cited

UNITED STATES PATENTS

| | | | |
|---|---|---|---|
| 1,427,251 | 8/1922 | Wood | 240—44.1 |
| 2,617,013 | 11/1952 | Smyth | 240—11.4 |

NORTON ANSHER, *Primary Examiner.*

R. A. WINTERCORN, *Assistant Examiner.*